United States Patent
Perlman et al.

(10) Patent No.: US 11,019,033 B1
(45) Date of Patent: May 25, 2021

(54) TRUST DOMAIN SECURE ENCLAVES IN CLOUD INFRASTRUCTURE

(71) Applicant: EMC IP Holding Company LLC, Hopkinton, MA (US)

(72) Inventors: Radia J. Perlman, Redmond, WA (US); Charles Kaufman, Redmond, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 41 days.

(21) Appl. No.: 16/728,112

(22) Filed: Dec. 27, 2019

(51) Int. Cl.
*H04L 29/06* (2006.01)
*H04L 9/08* (2006.01)

(52) U.S. Cl.
CPC ........ *H04L 63/0272* (2013.01); *H04L 9/0897* (2013.01); *H04L 63/0218* (2013.01); *H04L 63/0442* (2013.01)

(58) Field of Classification Search
CPC ............... H04L 63/0272; H04L 9/0897; H04L 63/0218; H04L 63/0442
USPC .......................................................... 726/15
See application file for complete search history.

(56) References Cited

U.S. PATENT DOCUMENTS

| | | |
|---|---|---|
| 6,577,734 B1 | 6/2003 | Etzel et al. |
| 7,814,318 B1 | 10/2010 | Perlman et al. |
| 8,650,657 B1 | 2/2014 | Shankar et al. |
| 8,832,466 B1 | 9/2014 | McGregor, Jr. et al. |
| 9,064,135 B1 | 6/2015 | Poo et al. |
| 9,071,429 B1 | 6/2015 | Roth et al. |
| 9,076,004 B1 | 7/2015 | Bogorad |
| 9,251,097 B1 | 2/2016 | Kumar et al. |
| 9,659,190 B1 | 5/2017 | Perlman et al. |
| 9,779,269 B1 | 10/2017 | Perlman |
| 9,906,361 B1 | 2/2018 | Perlman et al. |

(Continued)

FOREIGN PATENT DOCUMENTS

EP 1414181 A1 4/2004

OTHER PUBLICATIONS

Wikipedia, "Convergent Encryption," www.en.wikipedia.org/wiki/Convergent_encryption, Mar. 14, 2018, 2 pages.

(Continued)

*Primary Examiner* — Peter C Shaw
(74) *Attorney, Agent, or Firm* — Ryan, Mason & Lewis, LLP

(57) ABSTRACT

An apparatus comprises at least one processing device that includes a processor coupled to a memory. The processing device is configured to establish a secure enclave in cloud infrastructure as part of a trust domain, to load the secure enclave with a program for execution in the secure enclave, and to provide the secure enclave with information sufficient to allow the secure enclave to prove to one or more clients of the trust domain that the secure enclave was established within the trust domain. The provided information customizes the secure enclave for the trust domain in a manner that is detectable by the one or more clients of the trust domain. The establishing, loading and providing are illustratively performed at least in part by an orchestrator component that is part of the trust domain and is implemented using a first physical machine that is separate from a second physical machine used to implement the secure enclave.

20 Claims, 4 Drawing Sheets

(56) References Cited

U.S. PATENT DOCUMENTS

| | | |
|---|---|---|
| 10,284,534 B1 | 5/2019 | Perlman et al. |
| 10,764,752 B1* | 9/2020 | Avetisov ............... H04L 63/062 |
| 2003/0002668 A1 | 1/2003 | Graunke et al. |
| 2005/0018853 A1 | 1/2005 | Lain et al. |
| 2006/0282666 A1 | 12/2006 | Kim |
| 2006/0288232 A1 | 12/2006 | Ho et al. |
| 2007/0130615 A1 | 6/2007 | Brace et al. |
| 2007/0226809 A1 | 9/2007 | Ellard |
| 2007/0245410 A1 | 10/2007 | Perlman et al. |
| 2008/0072047 A1 | 3/2008 | Sarikaya et al. |
| 2008/0212770 A1 | 9/2008 | Satou et al. |
| 2009/0110191 A1 | 4/2009 | Sanvido et al. |
| 2010/0054479 A1 | 3/2010 | Kao et al. |
| 2011/0158405 A1 | 6/2011 | Choi et al. |
| 2011/0173460 A1 | 7/2011 | Ito et al. |
| 2011/0225428 A1 | 9/2011 | Stufflebeam, Jr. et al. |
| 2011/0252232 A1 | 10/2011 | De Atley et al. |
| 2011/0283113 A1 | 11/2011 | Moffat et al. |
| 2012/0072716 A1 | 3/2012 | Hu et al. |
| 2012/0173885 A1 | 7/2012 | Ascar et al. |
| 2012/0284528 A1 | 11/2012 | Orovitz |
| 2013/0103945 A1 | 4/2013 | Cannon et al. |
| 2013/0290274 A1 | 10/2013 | Patil et al. |
| 2013/0305057 A1 | 11/2013 | Greco et al. |
| 2013/0322621 A1 | 12/2013 | Yoon et al. |
| 2014/0006802 A1 | 1/2014 | Cachin et al. |
| 2014/0025963 A1 | 1/2014 | Subramanian |
| 2014/0068257 A1 | 3/2014 | Burckard |
| 2014/0068279 A1 | 3/2014 | Kurspahic et al. |
| 2014/0143543 A1 | 5/2014 | Aikas et al. |
| 2014/0283010 A1 | 9/2014 | Rutkowski et al. |
| 2014/0351605 A1 | 11/2014 | De Atley et al. |
| 2014/0359309 A1 | 12/2014 | Cachin et al. |
| 2015/0019870 A1 | 1/2015 | Patnala et al. |
| 2015/0033012 A1* | 1/2015 | Scarlata ............... H04L 9/3242 713/161 |
| 2015/0220746 A1 | 8/2015 | Li et al. |
| 2015/0288512 A1 | 10/2015 | McGregor et al. |
| 2015/0347768 A1* | 12/2015 | Martin .................... G06F 21/62 726/1 |
| 2016/0062918 A1 | 3/2016 | Androulaki et al. |
| 2016/0154839 A1 | 6/2016 | Bezawada et al. |
| 2016/0323250 A1 | 11/2016 | Winter et al. |
| 2016/0342814 A1 | 11/2016 | Wang et al. |
| 2017/0005809 A1 | 1/2017 | Adam et al. |
| 2017/0118180 A1 | 4/2017 | Takahashi |
| 2017/0310647 A1* | 10/2017 | Hu ....................... H04L 63/0853 |
| 2018/0183578 A1* | 6/2018 | Chakrabarti .......... H04L 9/3247 |
| 2018/0183580 A1* | 6/2018 | Scarlata ................ G06F 9/4856 |
| 2018/0211035 A1 | 7/2018 | Costa |
| 2018/0211067 A1 | 7/2018 | Costa |
| 2018/0241572 A1 | 8/2018 | Miele et al. |
| 2018/0287802 A1* | 10/2018 | Bricked ................ H04L 9/3263 |
| 2018/0330077 A1 | 11/2018 | Gray |
| 2019/0007216 A1 | 1/2019 | Meriac |
| 2019/0044729 A1* | 2/2019 | Chhabra ................ H04L 9/0637 |
| 2019/0052469 A1 | 2/2019 | Scarlata et al. |
| 2019/0087597 A1 | 3/2019 | Hunt et al. |
| 2019/0155636 A1 | 5/2019 | Smith et al. |
| 2019/0158277 A1 | 5/2019 | Edgecombe et al. |
| 2019/0243963 A1 | 8/2019 | Soriente et al. |
| 2019/0286577 A1 | 9/2019 | Leitao et al. |

OTHER PUBLICATIONS

Radia Perlman, "File System Design with Assured Delete," 14th Annual Network and Distributed System Security Symposium (NDSS), Feb.-Mar. 2007, 13 pages.

Ittai Anati et al., "Innovative Technology for CPU Based Attestation and Sealing," Intel Corporation, 2013, 7 pages.

Intel Corporation, "Intel Software Guard Extensions Trusted Computing Base Recovery," Intel Software Guard Extensions White Paper, 2019, 8 pages.

Simon Johnson et al., "Intel Software Guard Extensions: EPID Provisioning and Attestation Service," Intel Corporation, 2016, 10 pages.

Intel Corporation, "Intel Software Guard Extensions," Developer Guide, 2016, 35 pages.

Intel Corporation, "A Primer on Intel Software Guard Extensions (Intel SGX)" 2019, 1 page.

U.S. Appl. No. 16/208,790 filed in the name of Radia J. Perlman et al. on Dec. 4, 2018 and entitled "Client-Side Encryption Supporting Deduplication Across Single or Multiple Tenants in a Storage System."

* cited by examiner

US 11,019,033 B1

TRUST DOMAIN SECURE ENCLAVES IN CLOUD INFRASTRUCTURE

FIELD

The field relates generally to information processing systems, and more particularly to security in information processing systems.

BACKGROUND

A number of different types of secure enclaves are known in the art. For example, Intel Software Guard Extensions (SGX) technology provides secure enclaves that are configured in such a way that an operating system, hypervisor or cloud administrator with root privileges cannot see secrets inside the enclaves. An SGX enclave can attest remotely that it is running on a genuine Intel chip, in SGX mode, with particular loaded program code. After this attestation, a secure communication channel can be established with the SGX enclave using protocols such as Transport Layer Security (TLS) or Internet Protocol Security (IPSec), at which point the SGX enclave can be safely provided with cryptographic keys or other secrets over the secure communication channel. The SGX enclave stores the provided secrets in protected storage, so that these secrets will not be visible to the operating system, hypervisor or cloud administrator with root privileges. Other types of secure enclaves with similar functionality are provided by other processor vendors, such as AMD and ARM. Despite the above-noted security advantages commonly associated with conventional secure enclaves, a need remains for further improvements in secure enclaves.

SUMMARY

Illustrative embodiments provide techniques for implementing secure enclaves in cloud infrastructure for respective trust domains.

For example, in some embodiments, common base code is used by mutually distrustful trust domains. An orchestrator in a given trust domain in such an embodiment can customize the base code in such a way that even though the resulting customized code may not be secret, it will not be useful except by a secure enclave initialized by the orchestrator, since the customized code is illustratively not operational without secret information inserted by the orchestrator later, and because once customized the secure enclave will only communicate with the original orchestrator and clients in the same trust domain.

In some embodiments, orchestration of a secure enclave involves configuring the secure enclave with secret information that the secure enclave uses to prove itself to clients of its trust domain.

Additionally or alternatively, orchestration of a secure enclave in illustrative embodiments includes configuring the secure enclave with information that allows it to authenticate clients in its trust domain.

In one embodiment, an apparatus comprises at least one processing device that includes a processor coupled to a memory. The processing device is configured to establish a secure enclave in cloud infrastructure as part of a trust domain, to load the secure enclave with a program for execution in the secure enclave, and to provide the secure enclave with information sufficient to allow the secure enclave to prove to one or more clients of the trust domain that the secure enclave was established within the trust domain. The provided information illustratively customizes the secure enclave for the trust domain in a manner that is detectable by the one or more clients of the trust domain.

The establishing, loading and providing are illustratively performed at least in part by an orchestrator component that is part of the trust domain and is implemented at least in part as a physical machine. For example, in some embodiments, the orchestrator component and the secure enclave are implemented on respective first and second physical machines, each a processing device comprising a processor coupled to a memory.

Separate sets of one or more secure enclaves may be established in the cloud infrastructure as part of respective ones of a plurality of trust domains comprising respective orchestrator components, with the one or more secure enclaves of each of the trust domains each being customized using different provided information in a manner that is detectable by one or more clients of that trust domain.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
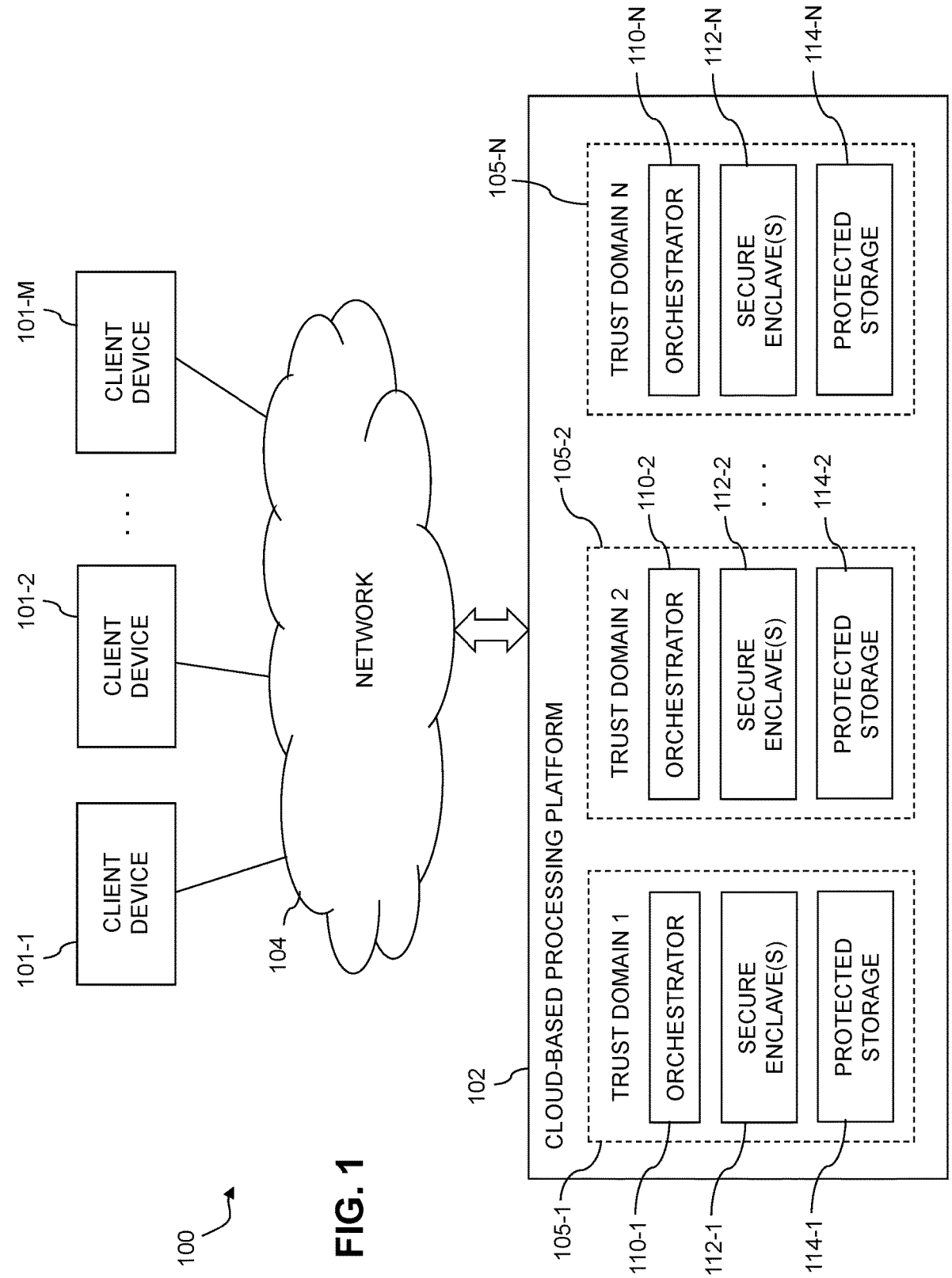
FIG. 1 is a block diagram of an information processing system configured to implement secure enclaves in cloud infrastructure for respective trust domains in an illustrative embodiment.

FIG. 1 shows an information processing system 100 configured in accordance with an illustrative embodiment. The information processing system 100 comprises a plurality of client devices 101-1, 101-2, . . . 101-M that communicate with a cloud-based processing platform 102 over a network 104. Users associated with respective ones of the client devices 101 illustratively comprise respective tenants of the cloud-based processing platform 102. At least subsets of those tenants illustratively comprise respective members of at least one trust domain of the system 100. Different portions of the cloud-based processing platform 102 are illustratively associated with different trust domains of system 100.

The client devices 101 illustratively comprise respective computers, mobile devices or other types of processing devices configured to communicate with the cloud-based processing platform 102 over the network 104. The client devices 101 and their corresponding users are examples of what are more generally referred to herein as "clients" of the system 100. In some embodiments, the client devices 101 are implemented on one or more other processing platforms separate from the cloud-based processing platform 102.

For example, at least a subset of the client devices 101 may be implemented as respective virtual machines of a compute services platform or other type of processing platform. The client devices 101 in such an arrangement illustratively provide compute services such as execution of one or more applications on behalf of each of one or more users associated with respective ones of the client devices 101. The term "user" herein is intended to be broadly construed so as to encompass numerous arrangements of human, hardware, software or firmware entities, as well as combinations of such entities.

The cloud-based processing platform 102 is illustratively configured to provide compute and/or storage services for users of the client devices 101. Such services may be provided at least in part under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used.

The cloud-based processing platform 102 in some embodiments may comprise a designated portion of a cloud-based system such as an Amazon Web Services (AWS) system. Other examples of cloud-based systems that can be used to provide at least portions of the cloud-based processing platform 102 and possibly other portions of system 100 include Google Cloud Platform (GCP) and Microsoft Azure.

Also, illustrative embodiments can be implemented outside of the cloud infrastructure context, for example, as a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP), Transmission Control Protocol (TCP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The cloud-based processing platform 102 is illustratively configured to implement trust domain secure enclaves, as will now be described in more detail.

As indicated previously, it is assumed in this embodiment that different portions of the cloud-based processing platform 102 are associated with different trust domains of the system 100. More particularly, as illustrated in the figure, the cloud-based processing platform 102 comprises a plurality of trust domains 105-1, 105-2, . . . 105-N, also denoted as Trust Domain 1, Trust Domain 2, . . . Trust Domain N. Trust domain 105-1 comprises an orchestrator 110-1, one or more secure enclaves 112-1 and protected storage 114-1. Similarly, trust domain 105-2 comprises an orchestrator 110-2, one or more secure enclaves 112-2 and protected storage 114-2, and trust domain 105-N comprises an orchestrator 110-N, one or more secure enclaves 112-N and protected storage 114-N.

Each such trust domain may further encompass additional system components that are not part of the cloud-based processing platform 102. For example, one or more of the client devices 101 may be considered part of a given one of the trust domains 105 of the system 100. The trust domains 105 are therefore shown in dashed outline in the figure, and should not be construed as being limited to components of the cloud-based processing platform 102. The term "trust domain" is therefore intended to be broadly construed, and may comprise, for example, a trust zone or other grouping of components associated with users that share access to designated protected resources of the system 100.

The orchestrators 110 control at least portions of the implementation of trust domain secure enclave functionality in the present embodiment, through interaction with their respective sets of secure enclaves 112. An example of such interaction comprises the process to be described below in conjunction with FIG. 2.

Each of the orchestrators 110 may be implemented on a different processing device of the cloud-based processing platform 102, with such processing devices illustratively being separate from one or more processing devices of the cloud-based processing platform 102 that are used to implement the one or more secure enclaves 112 corresponding to that orchestrator. Numerous other arrangements of processing devices of one or more processing platforms can be used to implement the orchestrators 110 and secure enclaves 112, with each such processing device comprising a processor coupled to a memory. For example, in some embodiments, the orchestrators 110 can be implemented outside of the cloud-based processing platform 102 that implements the secure enclaves 112, such as in one or more physical machines of one or more separate processing platforms of system 100, not explicitly shown. The trust domains 105 and their corresponding components are therefore not confined to the cloud-based processing platform 102 of system 100. Different physical machines or other processing devices, possibly on different processing platforms, can therefore be used to implement different ones of the orchestrators 110 and the secure enclaves 112.

The secure enclaves 112 can comprise, for example, otherwise conventional secure enclaves, such as SGX secure enclaves, suitably modified to operate in accordance with trust domain secure enclave functionality as disclosed herein. Additional details regarding SGX secure enclaves can be found, for example, in Intel Corporation, "Intel Software Guard Extensions," Developer Guide, 2016, which is incorporated by reference herein. These and other types of secure enclaves from other processor vendors, such as AMD and ARM, can be suitably modified to operate in accordance with trust domain secure enclave functionality as disclosed herein. Accordingly, references herein to "secure enclaves" are therefore intended to be broadly construed, and should not be viewed as being limited to SGX secure enclaves or any other particular type of secure enclave.

The secure enclaves 112 in this embodiment provide secure access to respective instances of protected storage 114 within their corresponding trust domains 105. These instances of protected storage 114 can be implemented using separate storage arrays or other storage systems of the cloud-based processing platform 102, or using different allocated portions of a single storage array or other storage system.

A given such storage system illustratively comprises solid state drives (SSDs). Such SSDs in some embodiments are implemented using non-volatile memory (NVM) devices such as flash memory. Other types of NVM devices that can be used to implement at least a portion of the storage devices of protected storage 114 include non-volatile random access memory (NVRAM), phase-change RAM (PC-RAM), magnetic RAM (MRAIVI), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, a storage system providing one or more of the instances of protected storage 114 of cloud-based processing platform 102 illustratively comprises one or more VNX®, VMAX®, Unity™ or PowerMax™ storage arrays, commercially available from Dell EMC of Hopkinton, Mass.

As another example, the instances of protected storage 114 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The cloud-based processing platform 102 comprises one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs. Additional examples of processing platforms utilized to implement storage systems and possibly one or more associated host devices in illustrative embodiments will be described in more detail below in conjunction with FIGS. 3 and 4.

At least a portion of the client devices 101 can in some embodiments be similarly implemented on one or more processing platforms, although numerous other arrangements are possible. For example, in some embodiments at least portions of the client devices 101 can be implemented within the cloud-based processing platform 102.

The term "processing platform" as used herein is intended to be broadly construed so as to encompass, by way of illustration and without limitation, multiple sets of processing devices and associated storage systems that are configured to communicate over one or more networks. For example, distributed implementations of the cloud-based processing platform 102 are possible, in which certain trust domain components reside in one data center in a first geographic location while other trust domain components reside in one or more other data centers in one or more other geographic locations that are potentially remote from the first geographic location. Accordingly, the orchestrators 110 can each be implemented on a different physical machine or other processing device than their respective secure enclaves 112. For example, a given one of the orchestrators 110 may be implemented in the form of private hardware under the control of a customer in a customer data center, while a corresponding one of the secure enclaves 112 is implemented on a processing device in a public cloud or other cloud infrastructure. The orchestrator of a given trust domain can therefore be implemented on a different physical machine than a corresponding secure enclave of that trust domain. These and numerous other arrangements of orchestrators 110 and secure enclaves 112 are possible using one or more processing devices of at least one processing platform.

The term "physical machine" as used herein is intended to be broadly construed, and illustratively comprises a computer, a server or other arrangement of at least one hardware processor coupled to at least one memory. A physical machine is also referred to herein as a processing device. A given one of the orchestrators 110, which are examples of what are more generally referred to herein as "orchestrator components" of respective trust domains, are illustratively implemented at least in part using one or more physical machines. References herein to such orchestrator components therefore necessarily connote physical structure of a given system, although the functionality of the orchestrator components can be provided at least in part using one or more software programs that run on physical machines.

The operation of a particular orchestrator 110-1 of the cloud-based processing platform 102 within its corresponding trust domain 105-1 will now be described in further detail. It is assumed that each of the other orchestrators 110 operates in a similar manner within its corresponding one of the trust domains 105 of the system 100. It is further assumed that each of the trust domains 105 further includes one or more clients illustratively corresponding to respective ones of the client devices 101. References below and elsewhere herein to "clients" can therefore illustratively refer to respective ones of the client devices 101 or their respective corresponding users in system 100.

The orchestrator 110-1 in the present embodiment is configured to establish a given one of the one or more secure enclaves 112-1 as part of its corresponding trust domain 105-1. For simplicity of description below, it will initially be assumed that there is only a single secure enclave 112-1 established by the orchestrator 110-1 in the trust domain 105-1 for use by one or more clients of that trust domain. However, although a single secure enclave 112-1 is referenced in certain description below, it is to be understood that separate sets of one or more secure enclaves may be established in respective ones of the trust domains 105 with the one or more secure enclaves of each of the trust domains 105 each being configured for exclusive use of one or more clients of that trust domain.

The orchestrator 110-1 loads the secure enclave 112-1 with at least one program for execution in the secure enclave 112-1. The orchestrator 110-1 further provides the secure enclave 112-1 with information sufficient to allow the secure enclave 112-1 to prove to the one or more clients of the trust domain 105-1 that the secure enclave 112-1 was established within the trust domain 105-1. The provided information illustratively customizes the secure enclave 112-1 for the trust domain 105-1 in a manner that is detectable by the one or more clients of the trust domain 105-1.

The orchestrator 110-1 therefore illustratively participates in the initialization of the secure enclave 112-1, and the secure enclave 112-1 could not otherwise prove to the one or more clients that it was established within the trust domain 105-1 without using the information provided to it by the orchestrator 110-1.

These and other interactions between the orchestrator 110-1 and the secure enclave 112-1 as disclosed herein, such as the above-noted establishing, loading and providing operations, can be implemented at least in part by the orchestrator 110-1 interacting directly with the secure enclave 112-1, and/or can be implemented at least in part by the orchestrator 110-1 interacting indirectly with the secure enclave 112-1 via one or more intermediary entities of the cloud-based processing platform 102 or system 100.

As indicated previously, separate sets of one or more secure enclaves 112 can be established in respective ones of the trust domains 105. The one or more secure enclaves of each of the trust domains are each customized using different provided information in a manner that is detectable by one or more clients of that trust domain.

In some embodiments, the program loaded by the orchestrator 110-1 into the secure enclave 112-1 comprises, for example, a program configured to encrypt data received from the one or more of clients that are part of the trust domain 105-1 for storage in protected storage 114-1 of the trust domain 105-1, and/or to decrypt data for delivery to the one or more clients of the trust domain 105-1 from the protected storage 114-1 of the trust domain 105-1, utilizing one or more cryptographic keys of the trust domain 105-1 that are stored in the secure enclave 112-1. For example, the program can be configured to perform both encryption and decryption within a single secure enclave, or alternatively can perform just encryption or just decryption within that secure enclave, with the complementary operation being performed by another program in a separate secure enclave. Illustrative embodiments can therefore utilize different secure enclaves 112 within the trust domain 105-1 to perform respective encryption and decryption operations using respective different programs.

A wide variety of additional or alternative programs can be used in other embodiments, such as programs that perform various computations on behalf of one or more of the client devices 101 that are part of the trust domain 105-1.

The secure enclave 112-1 is illustratively configured to utilize the information provided by the orchestrator 110-1 to prove to the one or more clients of the trust domain 105-1 that the secure enclave 112-1 was established within the trust domain 105-1. Advantageously, this is done without carrying out an attestation protocol, such as an SGX attestation protocol, that requires the secure enclave 112-1 to verify at least portions of the code of the loaded program with any of the one or more clients. The secure enclave 112-1 also authenticates the one or more clients as being part of the trust domain 105-1, illustratively using additional information provided by the orchestrator 110-1, as will be described below.

In some embodiments, the program loaded by the orchestrator 110-1 into the secure enclave 112-1 comprises base code that is common to all of the trust domains 105 and additional code that is unique to the first trust domain 105-1 and utilizable exclusively by the one or more clients of the first trust domain 105-1. For example, different customized versions of a given program having common base code can be loaded for secure enclave execution in respective different ones of the trust domains 105.

The orchestrator 110-1 is further configured to provide the secure enclave 112-1 with additional information sufficient to allow the secure enclave to authenticate the one or more clients of the trust domain 105-1. This additional information provided by the orchestrator 110-1 is in addition to the above-noted information sufficient to allow the secure enclave 112-1 to prove to the one or more clients of the trust domain 105-1 that the secure enclave 112-1 was established within the trust domain 105-1.

The additional information illustratively comprises, by way of example only, information for use in verification of passwords of respective ones of the one or more clients, public keys of respective ones of the one or more clients, a public key of a certificate authority (CA) that provides certificates for respective ones of the one or more clients, a public key of a key distribution center (KDC) that provides information for authenticating respective ones of the one or more clients, a private key shared with the KDC, and/or a public key of an identity provider that provides information for authenticating respective ones of the one or more clients.

The information for use in verification of passwords of respective ones of the one or more clients illustratively comprises one-way hashes of the passwords. Such one-way hashes allow the secure enclave 112-1 to verify the passwords but do not allow the secure enclave 112-1 to impersonate the corresponding clients.

The orchestrator 110-1 of the trust domain 105-1 provides the program to the secure enclave 112-1 and carries out an attestation protocol with the secure enclave 112-1 in which the secure enclave 112-1 provides an attestation to the orchestrator 110-1 that includes a hash of the program. For example, the attestation protocol can comprise an SGX attestation protocol of the type noted above. Such attestation protocols are generally substantially more complex than protocols such as TLS or IPSec that are used to establish secure communications outside of the secure enclave attestation context.

Accordingly, in some embodiments, it is only the orchestrator 110-1 that carries out a relatively high complexity attestation protocol with the secure enclave 112-1 in the trust domain 105-1. The clients of the trust domain 105-1 do not have to carry out such a relatively high complexity attestation protocol with the secure enclave 112-1, and can instead simply establish secure communications with the secure enclave 112-1 utilizing a relatively low complexity secure communication protocol such as TLS or IPSec. The clients of the trust domain 105-1 are therefore advantageously relieved of the burden of executing an attestation protocol with the secure enclave 112-1 each time any such client needs to utilize the loaded program, and instead all such clients can rely on a single instance of the attestation protocol carried out between the orchestrator 110-1 and the secure enclave 112-1.

A wide variety of different cryptographic arrangements can be used to provide security for the trust domain 105-1. For example, in some embodiments, the orchestrator 110-1 generates or otherwise obtains an orchestrator public-private key pair, stores the private key of the orchestrator public-private key pair in its own secure memory, and configures the secure enclave 112-1 to store the public key of the orchestrator public-private key pair. Subsequent to such configuration, the secure enclave 112-1 communicates with the orchestrator 110-1 to the exclusion of any of the other orchestrators 110 of respective ones of the other trust domains 105 in the cloud-based processing platform 102.

In other words, the secure enclave 112-1 will not communicate with any orchestrator 110 other than the single orchestrator 110-1 that can demonstrate possession of the corresponding private key of the orchestrator public-private key pair. Such an arrangement advantageously provides the orchestrator 110-1 with exclusive control over the secure enclave 112-1 that it established. This configuration can occur concurrently with or otherwise in conjunction with the establishment of the secure enclave 112-1.

The orchestrator 110-1 illustratively configures the secure enclave 112-1 with additional or alternative types of information. For example, the orchestrator 110-1 can configure the secure enclave with a domain name service (DNS) name or other type of identifier through which the secure enclave 112-1 is locatable by the one or more clients of the trust domain 105-1, so as to allow the one or more clients to easily locate the secure enclave 112-1.

In some embodiments, the information provided to the secure enclave 112-1 by the orchestrator 110-1 that is sufficient to allow the secure enclave 112-1 to prove to the one or more clients of the trust domain 105-1 that the secure enclave 112-1 was established within the trust domain 105-1 more particularly comprises a public-private key pair for the secure enclave 112-1, a certificate signed by the orchestrator 110-1 for a public key of the secure enclave 112-1, a certificate signed by an entity other than the orchestrator 110-1 for a public key of the secure enclave 112-1, one or more cryptographic keys of the trust domain 105-1, and/or credentials allowing the secure enclave 112-1 to obtain one or more cryptographic keys of the trust domain 105-1 from an external key manager.

Other additional or alternative types of information can be provided by the orchestrator 110-1 to the secure enclave 112-1 in order to allow the secure enclave 112-1 to prove to the one or more clients of the trust domain 105-1 that the secure enclave 112-1 was established within the trust domain 105-1. These and other references herein to "information sufficient" to allow the secure enclave to provide proof to one or more clients of a trust domain are therefore intended to be broadly construed, and can vary depending upon factors such as the particular security configuration desired in a given implementation. Also, a wide variety of different types of information can be provided by the orchestrator 110-1 to the secure enclave 112-1 so as to customize the secure enclave 112-1 for the trust domain 105-1 in a manner that is detectable by the one or more clients of the trust domain 105-1.

These and other references herein to "customizing" a secure enclave for a particular trust domain are intended to be broadly construed, so as to encompass numerous different types of customization that can ensure that a client knows that it is interacting with a secure enclave of its own trust domain.

In some embodiments, loading the secure enclave 112-1 with a program for execution in the secure enclave 112-1 comprises loading the secure enclave 112-1 with a modified version of the program that incorporates a designated portion of the above-described information sufficient to allow the secure enclave 112-1 to prove to one or more clients of the trust domain 105-1 that the secure enclave was established within the trust domain 105-1. For example, non-secret portions of that information can be incorporated into or otherwise provided in conjunction with the loaded program.

As noted above, the one or more clients of the trust domain 105-1 are not required to execute a relatively high complexity attestation protocol with the secure enclave 112-1. Instead, the one or more clients can locate the secure enclave 112-1 using DNS, and then communicate with the secure enclave 112-1 in a manner that allows the secure enclave 112-1 to prove to the one or more clients of the trust domain 105-1 that the secure enclave was established within the trust domain 105-1, while also authenticating the one or more clients as being part of the trust domain 105-1. For example, in some embodiments, the secure enclave 112-1 is further configured to receive a communication from a first one of the one or more clients via a DNS name or other identifier configured into the secure enclave 112-1, to provide a certificate to the first client, to prove its knowledge of a corresponding private key to the first client, and to authenticate the first client as being part of the trust domain 105-1.

In some embodiments, different programs utilizing common base code can be loaded into respective ones of the secure enclaves 112 in different ones of the trust domains 105, in a manner that ensures that each of one or more clients in the same trust domain knows that it is communicating with a secure enclave of that trust domain, and each secure enclave communicates with the one or more clients of its trust domain to the exclusion of any clients that are not part of that trust domain.

Additional embodiments illustrating this advantageous functionality will now be described in more detail.

It is assumed for these additional embodiments that each of the trust domains 105 comprises a plurality of users, also referred to as clients, illustratively associated with respective ones of the client devices 101, and that each such client in the same trust domain can read and write data to and from the corresponding instance of protected storage 114 of that trust domain in cloud-based processing platform 102.

The data is stored in the instance of protected storage 114 in encrypted form, with the encryption and decryption of the data being performed by the corresponding one of the secure enclaves 112 using a program loaded into that secure enclave by its corresponding one of the orchestrators 110. The secure enclave holds one or more cryptographic keys required to perform the encryption and decryption of the data for its trust domain, illustratively provisioned into the secure enclave by the orchestrator in the manner previously described. Alternatively, as indicated previously, separate secure enclaves 112 may be utilized to perform respective encryption and decryption operations within a given one of the trust domains 105.

Plaintext data is read and written by clients in the trust domain through a secure connection established with the secure enclave using a secure communication protocol such as TLS or IPSec. The secure enclave encrypts data received from a client before storing it in the protected storage of its trust domain, and decrypts data retrieved from the protected storage of its trust domain before sending it to a client, with such interactions with a user occurring over a TLS or IPSec connection, or other suitable secure connection.

Although the clients of the trust domain could instead perform encryption and decryption locally, and send and receive ciphertext from the cloud-based processing platform 102, implementing such encryption and decryption operations in the secure enclave advantageously provides additional security, as storage of the one or more cryptographic keys in the secure enclave is generally safer than storing such keys in each of a potentially very large number of clients. Moreover, such arrangements with local encryption and decryption would generally require each client to have the ability to carry out a relatively high complexity secure enclave attestation protocol, which may not be suitable or desirable, or even possible, for the particular client device configuration. These and other drawbacks associated with local encryption and decryption are advantageously overcome by illustrative embodiments herein.

As noted above, the encryption and decryption in some embodiments are illustratively performed by a program loaded into a corresponding one of the secure enclaves by the orchestrator of its trust domain, such as a program loaded into the secure enclave 112-1 by orchestrator 110-1 in trust domain 105-1. That same program, or at least common base code of that program, can be used by other ones of the secure enclaves 112 in other ones of the trust domains 105. However, in such situations, the one or more clients of trust domain 105-1 would not want the one or more clients of any other one of the trust domains 105 to be able to use the same secure enclave that knows the one or more cryptographic keys of trust domain 105-1. Embodiments disclosed herein advantageously allow multiple distinct trust domains to each utilize the same base code, while also ensuring that each client is using a secure enclave of its trust domain, and that no clients outside of that trust domain can use that secure enclave.

Such functionality is highly useful in a wide variety of different processing applications. For example, it illustratively implements multiple instances of secure enclaves 112 across respective ones of the distinct trust domains 105, with each such secure enclave potentially starting with the same base code, while securely customizing each such secure enclave in order to enable multiple clients in the same trust domain to use that secure enclave, while no clients outside of the trust domain can use that secure enclave.

Assume by way of example that there is program P available in the system 100 that includes base code configured to implement all of the required operations of a given processing application, less the above-noted customization for a particular one of the trust domains, illustratively trust domain 105-1. The orchestrator 110-1 establishes secure enclave 112-1 in the manner previously described, and loads P into the secure enclave 112-1. The orchestrator 110-1 is trusted by all of the clients of the trust domain 105-1. The orchestrator 110-1 has a private key of an orchestrator public-private key pair, and each of the clients in trust domain 105-1 is configured with the public key of the orchestrator public-private key pair.

The orchestrator 110-1 illustratively obtains the above-noted program P from a trusted source. For example, the base code of program P as received by orchestrator 110-1 can be signed by an entity of system 100 that is trusted by the orchestrator 110-1. The signature of the trusted entity from which the program P is obtained may be a signature on a hash of the program code, denoted H(P), where H illustratively comprises a particular designated secure hashing algorithm, such as SHA1, SHA2 or SHA256, although other types of hash functions can be used in other embodiments. Such hash functions are illustratively configured to generate a fixed-length value from a given code block, with the fixed-length value having a length that is substantially less than a length of the code block itself. For example, the SHA1 algorithm can be used to produce a 20-byte value from a multi-kilobyte code block, such as a 4 KB, 8 KB or 16 KB block, with the 20-byte value being unique to the particular content of the code block. Multiple instances of the same code block will therefore each produce the same 20-byte value responsive to application of the SHA1 algorithm to the code block.

As noted above, the orchestrator 110-1 establishes the secure enclave 112-1 and loads it with program P, after first verifying that the program P was obtained from a trusted source. Assuming by way of example that the secure enclave 112-1 is implemented using SGX, the secure enclave 112-1 attests to the orchestrator 110-1 that it is a genuine SGX enclave running program P identified by hash H(P). The orchestrator 110-1 then establishes a secure connection with the secure enclave 112-1, illustratively using a secure communication protocol such as TLS or IPSec, and further communication between the orchestrator 110-1 and the secure enclave 112-1 is then encrypted so as to be hidden from an associated operating system, hypervisor and/or cloud administrator with root privileges.

The orchestrator 110-1 uses its secure connection to the secure enclave 112-1 to provide the secure enclave 112-1 with information sufficient to allow the secure enclave 112-1 to prove to one or more clients of the trust domain 105-1 that the secure enclave 112-1 was established within the trust domain 105-1. This provided information in some embodiments includes both secret and non-secret information. In other embodiments, at least portions of the non-secret information can be loaded into the secure enclave 112-1 as part of the program P, as additional code that supplements and thereby customizes the base code.

When an SGX enclave is loaded with program code, that program code may in some implementations become visible to components of the cloud-based processing platform 102 outside of the trust domain 105-1, so secrets such as the one or more cryptographic keys utilized to perform encryption and decryption of client data in trust domain 105-1 generally cannot be loaded with the code in those implementations.

Examples of information that the orchestrator 110-1 can configure into or otherwise provide to the secure enclave 112-1 in illustrative embodiments include the following:

1. A public key of the orchestrator 110-1. This facilitates future communication with orchestrator 110-1, for instance, if orchestrator 110-1 wants to update credentials, or add credentials for new clients in the trust domain 105-1.

2. The DNS name or other identifier of the service the secure enclave 112-1 will provide to clients of the trust domain 105-1. This is how the clients of the trust domain 105-1 will locate the secure enclave 112-1.

3. A public-private key pair for the secure enclave 112-1. Alternatively, the secure enclave 112-1 could choose a key pair and send the public key of its key pair to orchestrator 110-1 for certification.

4. A certificate signed by orchestrator 110-1 or another entity for the public key of the public-private key pair of the secure enclave 112-1. This information will enable clients of the trust domain 105-1 to know to trust the secure enclave 112-1.

The secure enclave 112-1 in illustrative embodiments is also configured with information on how to authenticate clients in the trust domain 105-1. As indicated previously, this information can include, for example, passwords or private keys of the clients, public keys of the clients, a public key of a CA that can provide certificates for authorized clients, and/or public key and contact information for a KDC or identity provider that can authenticate clients.

Once configured in the manner described above, the secure enclave 112-1 will illustratively refuse to communicate with any orchestrator 110 other than the particular one whose public key the secure enclave 112-1 is configured with, namely, orchestrator 110-1.

Additionally or alternatively, various types of application-specific information may be configured into the secure enclave 112-1 by the orchestrator 110-1. For example, in the encryption/decryption application described above, orchestrator 110-1 can provide the one or more cryptographic keys required to perform the encryption and decryption for the trust domain 105-1, or can provide credentials with which the secure enclave 112-1 can fetch the encryption keys from an external key manager. Numerous other types of application-specific information can be configured into or otherwise provided to the secure enclave 112-1 by the orchestrator 110-1 in other embodiments.

As noted above, the secure enclave 112-1 in some embodiments attests to the orchestrator 110-1 that it is a genuine SGX enclave running program P identified by hash H(P). The orchestrator 110-1 then establishes a secure connection with the secure enclave 112-1, illustratively using TLS or IPSec. Secret information can then be provided by the orchestrator 110-1 to the secure enclave 112-1, and remains hidden from an associated operating system, hypervisor and/or cloud administrator with root privileges.

As indicated previously, instead of configuring the above-noted information into the secure enclave 112-1 after the secure enclave 112-1 is loaded with the program P, the orchestrator 110-1 could modify the program P to include at least portions of the non-secret information, resulting in a new program, also illustratively denoted as a modified program P'. The modified program P' in this embodiment includes only non-secret information because it is possible that the program code when loaded in some implementations, such as SGX implementations, becomes visible to portions of the cloud-based processing platform outside of the trust domain 105-1.

Examples of such non-secret information illustratively include a DNS name and certificate of the secure enclave 112-1, the public key of the orchestrator 110-1, public keys of clients, and/or public keys for authorized CAs or identity providers to certify the clients.

An embodiment of this type which utilizes a modified program P' generally operates in a manner similar to that previously described, except that in the initial attestation, the secure enclave 112-1 will attest to being loaded with H(P'), and the orchestrator 110-1 will configure the secure enclave 112-1 with secret information, such as the private key of the secure enclave 112-1, or one or more cryptographic keys used to perform encryption and decryption in accordance with the modified program P'.

As indicated previously, clients of the trust domain 105-1 communicate with the secure enclave 112-1 in order to provide data to the secure enclave 112-1 for encrypted storage in the protected storage 114-1, and to obtain decrypted data via the secure enclave 112-1 from the protected storage 114-1.

In some embodiments, the communication between a given client C of trust domain 105-1 and the secure enclave 112-1 of trust domain 105-1 is as follows:

1. C is configured with the public key of orchestrator 110-1 and the DNS name of secure enclave 112-1.

2. C communicates with the secure enclave 112-1 as it would any web-based service reachable by DNS name.

3. The secure enclave 112-1 sends C a certificate signed by orchestrator 110-1 or another entity and proves knowledge of the corresponding private key. This can be done at least in part using functionality of an existing protocol such as TLS or IPSec.

4. The secure enclave 112-1 also authenticates C based on information configured into the secure enclave 112-1 by orchestrator 110-1.

5. C uses its secure communication channel with the secure enclave 112-1 to send data for encryption by the loaded program P or P' for storage in the protected storage 114-1. Additional or alternative information required by a given application can be similarly sent over this channel from C to the secure enclave 112-1, including secret information such as keys that may be needed by the application.

The above-described communication mechanism allows lightweight clients to communicate securely with the secure enclave 112-1, without requiring each client to perform a complex SGX attestation process, in conjunction with which the client would need to demonstrate knowledge of H(P) or H(P').

For example, illustrative embodiments allow the secure enclave 112-1 to be configured so that it can use standard protocols such as TLS or IPSec to authenticate to clients. Without the disclosed techniques, if secret information such as a TLS or IPSec private key for the secure enclave were instead to be embedded into the code loaded into the secure enclave, such an arrangement would generally not provide an adequate level of security, as the cloud infrastructure can see the loaded code, including the embedded private key. Such security issues are addressed and overcome by illustrative embodiments disclosed herein.

Additionally or alternatively, illustrative embodiments allow secure usage of common base code in multiple trust domains. Absent use of the disclosed techniques, if the same base code were to be loaded into secure enclaves in different trust domains, there would be no way for a client in one of the trust domains to know that the client is interacting with the particular secure enclave of its own trust domain, rather than with one of the other secure enclaves of one of the other trust domains that use the same base code. In illustrative embodiments herein, customization of the secure enclaves in each trust domain by an associated orchestrator advantageously eliminates this security problem.

Similar advantages are obtained in illustrative embodiments in which the orchestrator of a given trust domain supplements the base code with non-secret information (e.g., an enclave public key), so that the resulting code will have a different hash than the base code or other customized versions of the base code from other trust domains. For example, such an arrangement can eliminate situations in which a client of one trust domain might otherwise inadvertently communicate with the secure enclave of another trust domain that uses the same base code. Moreover, in some embodiments, even a malicious public cloud conspiring with a malicious orchestrator could not leverage a secure enclave configured with non-secret information to perform any malicious action.

In some embodiments, the secure enclave 112-1 is created in multiple steps, illustratively including at least a first step that is executed on a physical machine that will host the secure enclave, but which in the case of cloud infrastructure might not be fully trusted by the application designer, and a second configuration and customization step that takes place at least in part over a network such as network 104 from a more trusted location, illustratively using a different physical machine that is not part of the same cloud infrastructure as the physical machine that is hosting the secure enclave. Terms such as "establishing a secure enclave" as broadly used herein are intended to encompass at least portions of these and other types of arrangements for creating secure enclaves.

For example, the secure enclave 112-1 in one or more embodiments is illustratively configured to receive secret information, from an entity of system 100 other than the orchestrator 110-1, in conjunction with establishment of the secure enclave 112-1. The secure enclave 112-1 utilizes the secret information to authenticate to the orchestrator 110-1 and to request additional configuration and customization information from the orchestrator 110-1. The secure enclave 112-1 then permanently deletes or otherwise permanently obscures the secret information prior to executing any program code that is dependent on the additional configuration and customization information.

Accordingly, the secure enclave 112-1 in an embodiment of this type uses secret information, possibly made available to it at its creation by hardware of its host physical machine, to authenticate to the orchestrator 110-1 and to request additional configuration and customization information, and then securely "forgets" the secret information, illustratively by permanently deleting or otherwise permanently obscuring the secret information, before executing any program code that is dependent on the additional configuration and customization information. Such an arrangement ensures that the secure enclave 112-1 can only be customized once, and even if there are bugs in the software, the secure enclave 112-1 cannot impersonate an uninitialized secure enclave and authenticate to an orchestrator in a different trust domain.

References above to certain features and functionality of the orchestrator 110-1, secure enclave 112-1 and protected storage 114-1 of trust domain 105-1 are assumed to be similarly present in the other orchestrators 110, secure enclaves 112 and protected storage 114 of the other trust domains 105.

It is also to be appreciated that the above-described features of system 100 and other features of other illustrative embodiments herein are presented by way of example only, and should not be construed as limiting in any way. Accordingly, different numbers, types and arrangements of system components such as client devices 101, cloud-based processing platform 102, network 104, trust domains 105, orchestrators 110, secure enclaves 112 and protected storage 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 210, and is suitable for use in the system 100 but is more generally applicable to other types of systems comprising one or more processing devices configured to implement secure enclaves.

Figure 2:
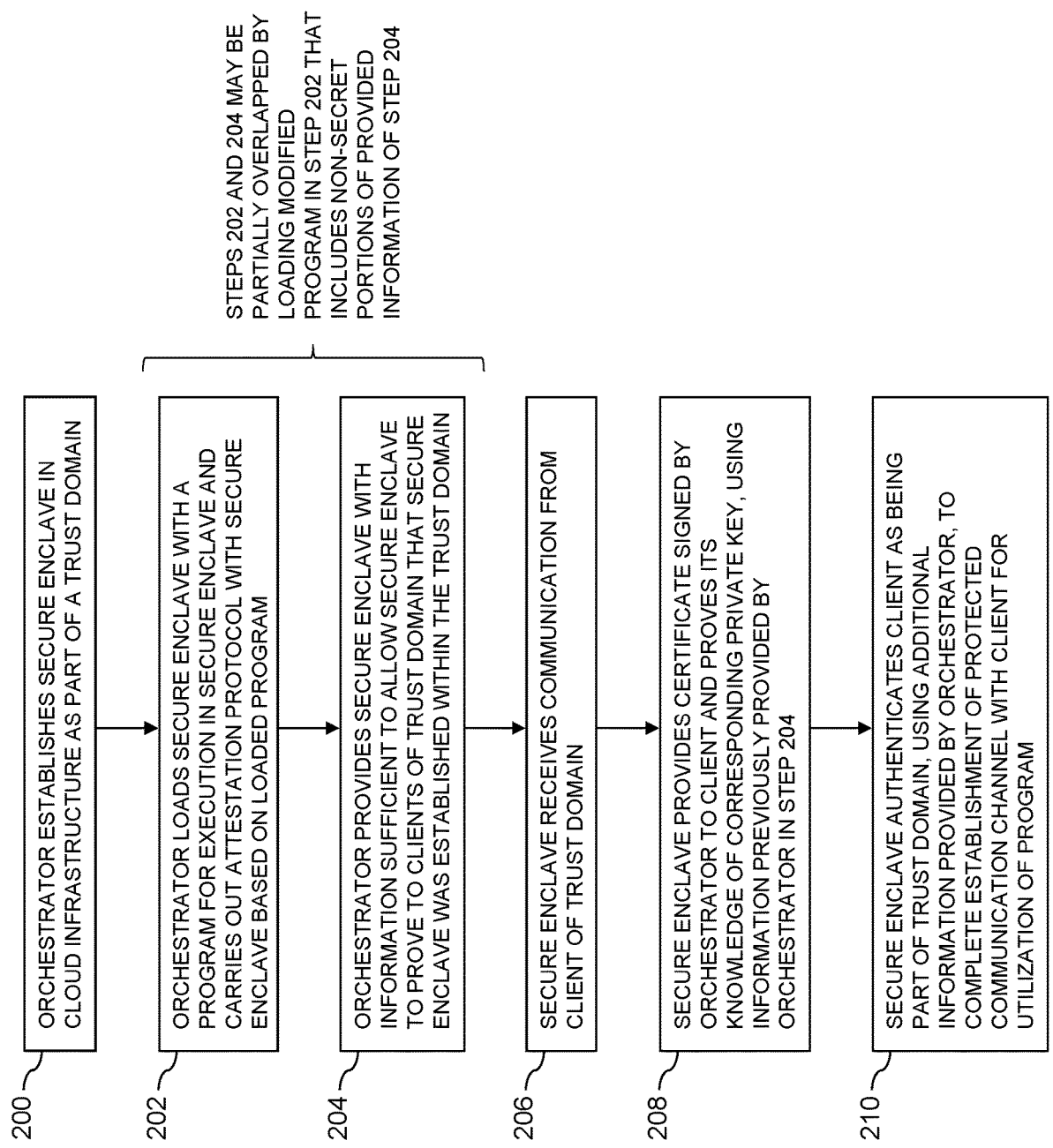
FIG. 2 is a flow diagram of a process for implementing secure enclaves in cloud infrastructure for respective trust domains in an illustrative embodiment.

The steps of the FIG. 2 process are illustratively performed primarily by or under the control of at least one processing device of the cloud-based processing platform 102 of system 100, such as a processing device that implements a given one of the orchestrators 110, although other arrangements of one or more system components can perform at least portions of one or more of the steps in other embodiments.

In step 200, an orchestrator establishes a secure enclave in cloud infrastructure as part of a trust domain. The orchestrator is illustratively a particular one of the orchestrators 110 and establishes a particular one of the secure enclaves 112 within its corresponding one of the trust domains 105.

It should be noted that terms such as "establishing a secure enclave" as used herein are intended to be broadly construed, and are not limited to arrangements in which the orchestrator directly establishes the secure enclave. For example, the orchestrator in some embodiments can indirectly establish the secure enclave by sending a request to a public cloud or other cloud infrastructure to create the secure enclave, and subsequently verifying in a cryptographic exchange that the secure enclave was created correctly. As indicated previously herein, in these and other embodiments, the orchestrator may be implemented on a different physical machine or other processing device than the secure enclave. For example, the orchestrator is illustratively implemented in the form of private hardware under the control of a customer in a customer data center, while the secure enclave is implemented on a processing device in a public cloud or other cloud infrastructure. Other types of interactions between an orchestrator and a secure enclave as disclosed herein, such as interactions associated with loading and providing operations, can similarly be performed directly, or indirectly via one or more intermediary entities of the system. These and numerous other arrangements of orchestrators and secure enclaves are possible using one or more processing devices.

In step 202, the orchestrator loads the secure enclave with a program for execution in the secure enclave and carries out an attestation protocol with the secure enclave based at least in part on the loaded program.

In step 204, the orchestrator provides the secure enclave with information sufficient to allow the secure enclave to prove to clients of the trust domain that the secure enclave was established within the trust domain. As indicated previously, the provided information illustratively customizes the secure enclave for the trust domain in a manner that is detectable by the clients of the trust domain. Such an arrangement can ensure that a given client knows that it is interacting with a secure enclave of its own trust domain.

It should be noted that steps 202 and 204 may be at least partially overlapped, for example, by loading a modified program in step 202 that includes non-secret portions of provided information of step 204. In such an arrangement, the non-secret portions of the information are provided by the orchestrator to the secure enclave as part of or otherwise in conjunction with the loading of the program in step 202, and secret portions of the information are provided by the orchestrator to the secure enclave in step 204.

In step 206, the secure enclave receives a communication from a client of the trust domain, such as one of the client devices 101 of system 100.

In step 208, the secure enclave provides a certificate signed by the orchestrator to the client and proves its knowledge of the corresponding private key to the client, using at least a portion of the information previously provided by the orchestrator in step 204. Alternatively, the certificate can be signed by an entity other than the orchestrator.

In step 210, the secure enclave authenticates the client as being part of the trust domain, using additional information provided to the secure enclave by the orchestrator, in order to complete establishment of protected communication channel with the client for utilization of the program.

Multiple additional instances of the FIG. 2 process can be performed in a given cloud-based processing platform or other arrangement of one or more processing devices in cloud infrastructure. For example, such additional instances can be used to establish additional secure enclaves within the same trust domain referenced in step 200, or in each of one or more additional trust domains. Different instances of the FIG. 2 process can therefore be performed by different orchestrators to provide respective sets of one or more secure enclaves in respective different trust domains of cloud infrastructure.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving processing devices and secure enclaves established by those processing devices. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different trust domain secure enclave arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Again, the particular secure enclave arrangements described above are presented by way of illustrative example only. Numerous alternative arrangements of these and other features can be used in implementing trust domain secure enclaves in other embodiments.

The illustrative embodiments disclosed herein can provide a number of significant advantages relative to conventional arrangements.

For example, some embodiments provide techniques for implementing secure enclaves in cloud infrastructure for respective trust domains.

In some embodiments, common base code is used by mutually distrustful trust domains. An orchestrator in a given trust domain in such an embodiment can customize the base code in such a way that even though the resulting customized code may not be secret, it will not be useful except by a secure enclave initialized by the orchestrator, since the customized code is illustratively not operational without secret information inserted by the orchestrator later, and because once customized the secure enclave will only communicate with the original orchestrator and clients in the same trust domain.

In some embodiments, orchestration of a secure enclave involves configuring the secure enclave with secret information that the secure enclave uses to prove itself to clients of its trust domain.

Additionally or alternatively, orchestration of a secure enclave in illustrative embodiments includes configuring the secure enclave with information that allows it to authenticate clients in its trust domain.

Moreover, the secure enclave in some embodiments may be further configured to authenticate the orchestrator after being configured a first time by the orchestrator.

Illustrative embodiments are configured to allow clients to communicate with a secure enclave in a simplified manner that does not require utilization of a complex attestation protocol in which clients would otherwise have to have knowledge of particular program code loaded into the secure enclave.

Some embodiments allow a secure enclave to be loaded with a program that includes base code supplemented and thereby customized with non-secret information. The secure enclave can then be configured with secret information after the program is loaded and the secure enclave is running.

In some embodiments, different types of secret and non-secret information are provisioned into a generic secure enclave in order to customize the secure enclave for the particular requirements of different trust domains.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement secure enclaves will now be described in greater detail with reference to FIGS. 3 and 4. Although described in the context of system 100, these platforms may also be used to implement at least portions of other information processing systems in other embodiments.

Figure 3:
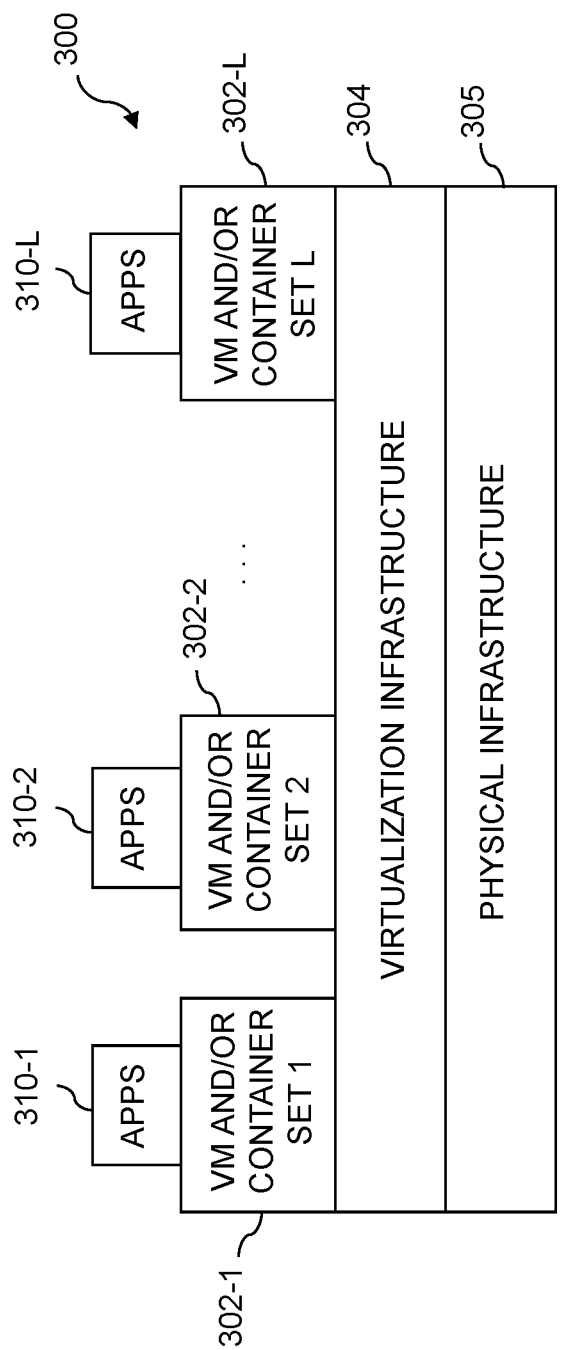
FIGS. 3 and 4 show examples of processing platforms that may be utilized to implement at least a portion of an information processing system with trust domain secure enclaves in illustrative embodiments.
Figure 4:
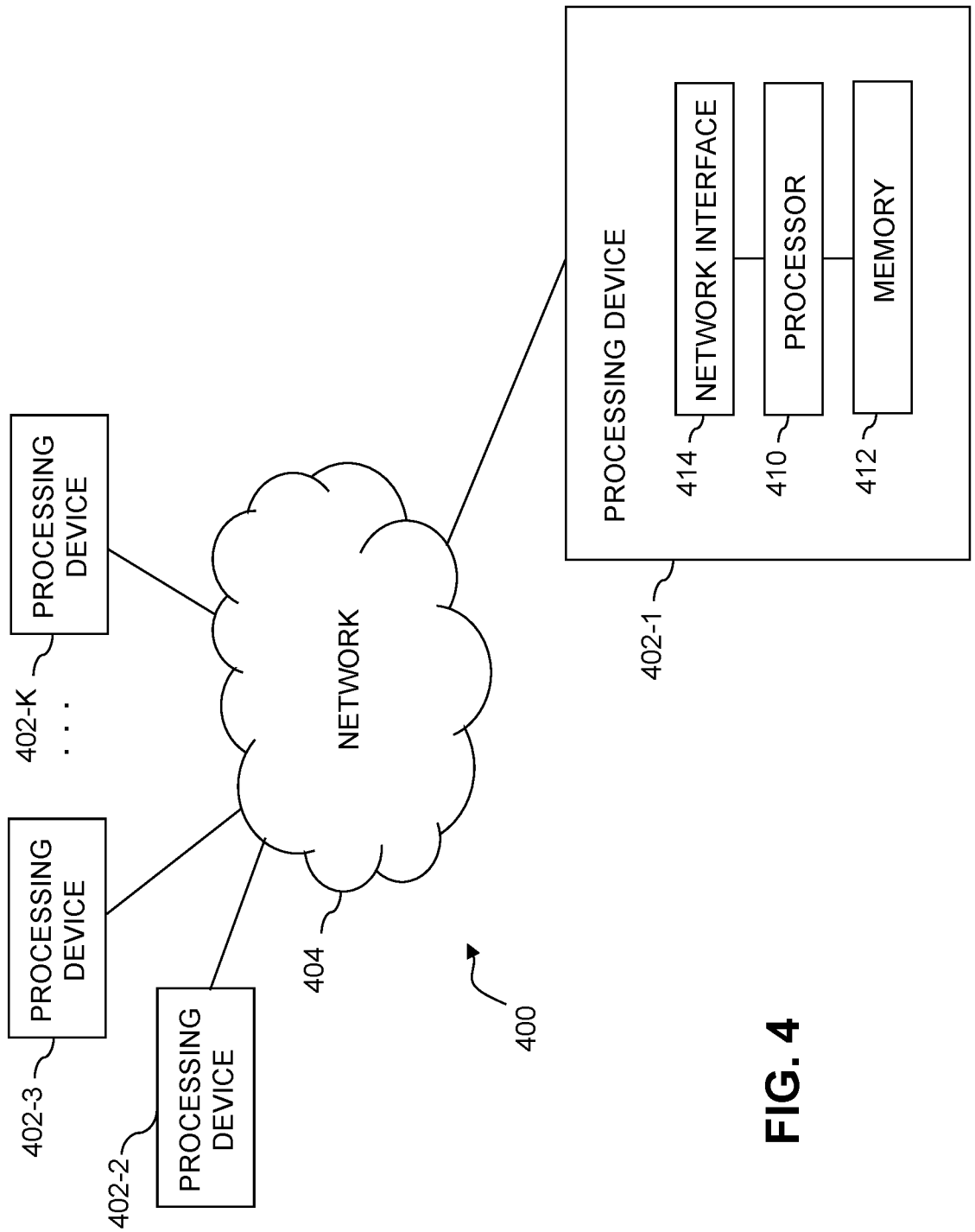

FIG. 3 shows an example processing platform comprising cloud infrastructure 300. The cloud infrastructure 300 comprises a combination of physical and virtual processing resources that may be utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 may comprise respective VMs, respective sets of one or more containers, or respective sets of one or more containers running in VMs.

In some implementations of the FIG. 3 embodiment, the VMs/container sets 302 comprise respective VMs implemented using virtualization infrastructure 304 that comprises at least one hypervisor. Such implementations can provide functionality for trusted domain secure enclaves in an information processing system of the type described above using one or more processes running on a given one of the VMs. For example, each of the VMs can implement one or more orchestrators and associated secure enclaves and protected storage instances in the cloud-based processing platform 102 of system 100.

A hypervisor platform may be used to implement a hypervisor within the virtualization infrastructure 304. Such a hypervisor platform may comprise an associated virtual infrastructure management system. The underlying physical machines may comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system. Such implementations can also provide functionality for trusted domain secure enclaves in an information processing system. For example, a container host device supporting multiple containers of one or more container sets can implement one or more orchestrators and associated secure enclaves and protected storage instances in the cloud-based processing platform 102 of system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 and includes a plurality of processing devices, denoted 402-1, 402-2, 402-3, . . . 402-K, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 412 may comprise random access memory (RAM), read-only memory (ROM), flash memory or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the secure enclave functionality as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, processing devices, orchestrators, secure enclaves, protected storage and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
said at least one processing device being configured:
to establish a secure enclave in cloud infrastructure as part of a trust domain;
to load the secure enclave with a program for execution in the secure enclave;
to provide the secure enclave with information sufficient to allow the secure enclave to prove to one or more clients of the trust domain that the secure enclave was established within the trust domain; and
to provide the secure enclave with additional information sufficient to allow the secure enclave to authenticate the one or more clients of the trust domain;
wherein the provided information customizes the secure enclave for the trust domain in a manner that is detectable by the one or more clients of the trust domain.

2. The apparatus of claim 1 wherein the program is configured to perform one or both of the following:
encrypting data received from the one or more clients for storage in protected storage of the trust domain in the cloud infrastructure; and
decrypting data for delivery to the one or more clients from the protected storage of the trust domain in the cloud infrastructure, utilizing one or more cryptographic keys of the trust domain that are stored in the secure enclave.

3. The apparatus of claim 1 wherein the secure enclave is configured to utilize the provided information to prove to the one or more clients of the trust domain that the secure enclave was established within the trust domain without carrying out an attestation protocol that requires the secure enclave to verify at least portions of the code of the loaded program with any of the one or more clients.

4. The apparatus of claim 1 wherein establishing a secure enclave in cloud infrastructure as part of a trust domain comprises establishing separate sets of one or more secure enclaves in respective ones of a plurality of trust domains and wherein the one or more secure enclaves of each of the trust domains are each customized using different provided information in a manner that is detectable by one or more clients of that trust domain.

5. The apparatus of claim 1 wherein the trust domain comprises a first trust domain of a plurality of trust domains of the cloud infrastructure and wherein the program comprises base code that is common to the plurality of trust domains and additional code that is unique to the first trust domain and utilizable exclusively by the one or more clients of the first trust domain.

6. The apparatus of claim 1 wherein the additional information comprises one or more of:
information for use in verification of passwords of respective ones of the one or more clients;
public keys of respective ones of the one or more clients;
a public key of a certificate authority that provides certificates for respective ones of the one or more clients;
a public key of a key distribution center that provides information for authenticating respective ones of the one or more clients;
a private key shared with the key distribution center; and
a public key of an identity provider that provides information for authenticating respective ones of the one or more clients.

7. The apparatus of claim 1 wherein loading the secure enclave with a program for execution in the secure enclave comprises loading the secure enclave with a modified version of the program that incorporates a designated portion of the information sufficient to allow the secure enclave to prove to one or more clients of the trust domain that the secure enclave was established within the trust domain.

8. The apparatus of claim 1 wherein the secure enclave is further configured:
to receive a communication from a first one of the one or more clients via a domain name service identifier configured into the secure enclave;
to provide a certificate to the first client;
to prove its knowledge of a corresponding private key to the first client; and
to authenticate the first client as being part of the trust domain.

9. An apparatus comprising:
at least one processing device comprising a processor coupled to a memory;
said at least one processing device being configured:
to establish a secure enclave in cloud infrastructure as part of a trust domain;
to load the secure enclave with a program for execution in the secure enclave; and
to provide the secure enclave with information sufficient to allow the secure enclave to prove to one or more clients of the trust domain that the secure enclave was established within the trust domain;
wherein the provided information customizes the secure enclave for the trust domain in a manner that is detectable by the one or more clients of the trust domain;
wherein said at least one processing device comprises a plurality of physical machines and the establishing, loading and providing are performed at least in part by an orchestrator component, wherein the orchestrator component is part of the trust domain and is implemented using a first physical machine that is separate from a second physical machine used to implement the secure enclave.

10. The apparatus of claim 9 wherein the orchestrator component of the trust domain provides the program to the secure enclave and carries out an attestation protocol with the secure enclave in which the secure enclave provides an attestation to the orchestrator component that includes a hash of the program.

11. The apparatus of claim 9 wherein the orchestrator component of the trust domain stores a private key of an orchestrator public-private key pair and further wherein the orchestrator component configures the secure enclave to store the public key of the orchestrator public-private key pair and subsequent to such configuration the secure enclave communicates with the orchestrator component to the exclusion of one or more other orchestrator components of one or more other trust domains in the cloud infrastructure.

12. The apparatus of claim 9 wherein the orchestrator component of the trust domain configures the secure enclave with a domain name service identifier through which the secure enclave is locatable by the one or more clients of the trust domain.

13. The apparatus of claim 9 wherein at least a portion of the information sufficient to allow the secure enclave to prove to one or more clients of the trust domain that the secure enclave was established within the trust domain is provided to the secure enclave by the orchestrator component and comprises one or more of:
- a public-private key pair for the secure enclave;
- a certificate signed by the orchestrator component for a public key of the secure enclave;
- a certificate signed by an entity other than the orchestrator component for a public key of the secure enclave;
- one or more cryptographic keys of the trust domain; and
- credentials allowing the secure enclave to obtain one or more cryptographic keys of the trust domain from an external key manager.

14. The apparatus of claim 9 wherein the secure enclave is further configured:
- to receive secret information, from an entity other than the orchestrator component, in conjunction with establishment of the secure enclave;
- to utilize the secret information to authenticate to the orchestrator component and to request additional configuration and customization information from the orchestrator component; and
- to permanently obscure the secret information prior to executing any program code that is dependent on the additional configuration and customization information.

15. A method comprising:
establishing a secure enclave in cloud infrastructure as part of a trust domain;
loading the secure enclave with a program for execution in the secure enclave;
providing the secure enclave with information sufficient to allow the secure enclave to prove to one or more clients of the trust domain that the secure enclave was established within the trust domain; and
providing the secure enclave with additional information sufficient to allow the secure enclave to authenticate the one or more clients of the trust domain;
wherein the provided information customizes the secure enclave for the trust domain in a manner that is detectable by the one or more clients of the trust domain; and
wherein the method is performed by at least one processing device comprising a processor coupled to a memory.

16. The method of claim 15 wherein said at least one processing device comprises a plurality of physical machines and the establishing, loading and providing are performed at least in part by an orchestrator component, wherein the orchestrator component is part of the trust domain and is implemented using a first physical machine that is separate from a second physical machine used to implement the secure enclave.

17. The method of claim 15 wherein establishing a secure enclave in cloud infrastructure as part of a trust domain comprises establishing separate sets of one or more secure enclaves in respective ones of a plurality of trust domains and wherein the one or more secure enclaves of each of the trust domains are each customized using different provided information in a manner that is detectable by one or more clients of that trust domain.

18. A computer program product comprising a non-transitory processor-readable storage medium having stored therein program code of one or more software programs, wherein the program code, when executed by at least one processing device comprising a processor coupled to a memory, causes said at least one processing device:
- to establish a secure enclave in cloud infrastructure as part of a trust domain;
- to load the secure enclave with a program for execution in the secure enclave;
- to provide the secure enclave with information sufficient to allow the secure enclave to prove to one or more clients of the trust domain that the secure enclave was established within the trust domain; and
- to provide the secure enclave with additional information sufficient to allow the secure enclave to authenticate the one or more clients of the trust domain;
- wherein the provided information customizes the secure enclave for the trust domain in a manner that is detectable by the one or more clients of the trust domain.

19. The computer program product of claim 18 wherein said at least one processing device comprises a plurality of physical machines and the establishing, loading and providing are performed at least in part by an orchestrator component, wherein the orchestrator component is part of the trust domain and is implemented using a first physical machine that is separate from a second physical machine used to implement the secure enclave.

20. The computer program product of claim 18 wherein the additional information comprises one or more of:
- information for use in verification of passwords of respective ones of the one or more clients;
- public keys of respective ones of the one or more clients;
- a public key of a certificate authority that provides certificates for respective ones of the one or more clients;
- a public key of a key distribution center that provides information for authenticating respective ones of the one or more clients;
- a private key shared with the key distribution center; and
- a public key of an identity provider that provides information for authenticating respective ones of the one or more clients.

* * * * *